June 19, 1951 C. A. BAKER ET AL 2,557,251
STONE SAWING MACHINE
Filed Feb. 2, 1949 5 Sheets-Sheet 5

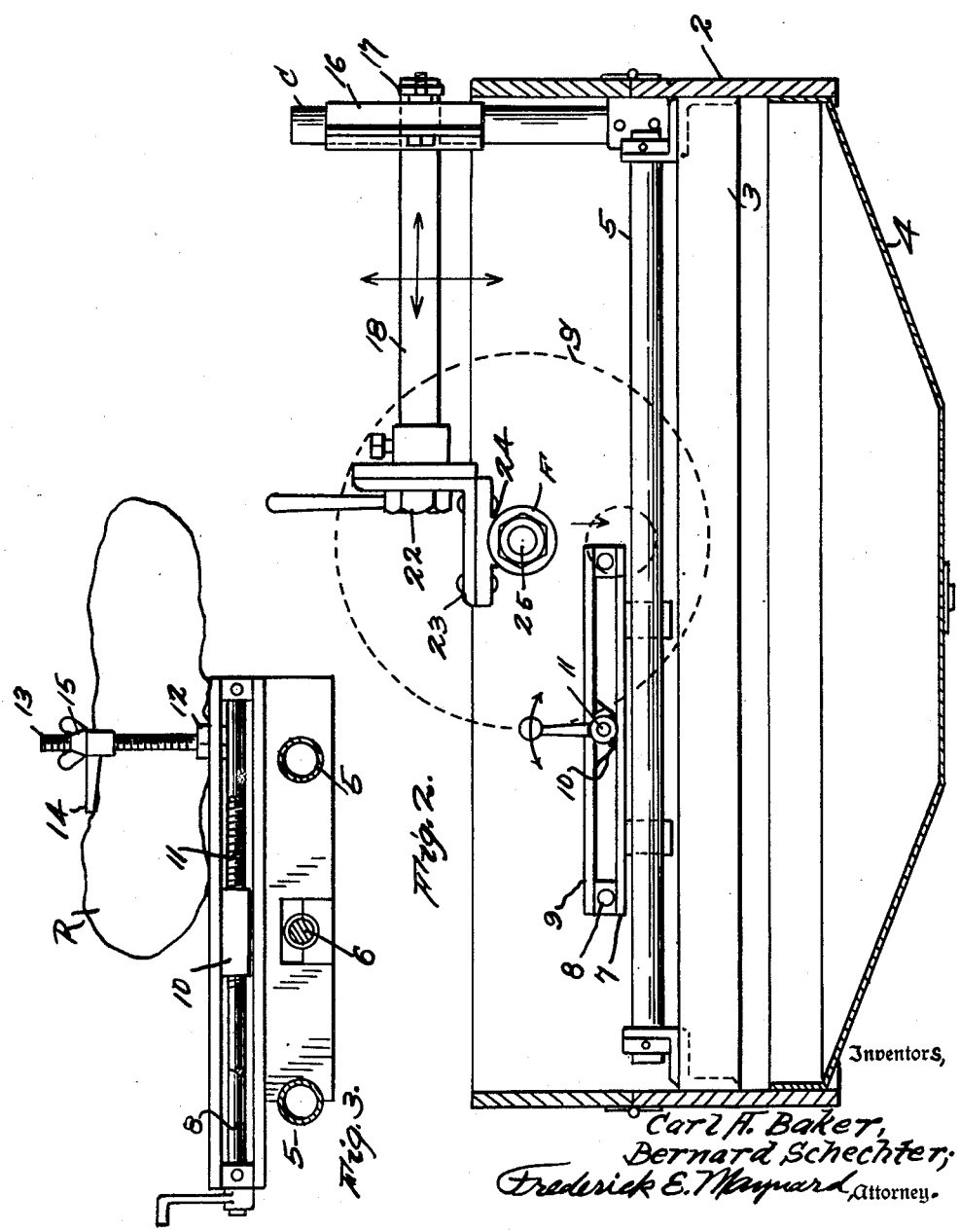

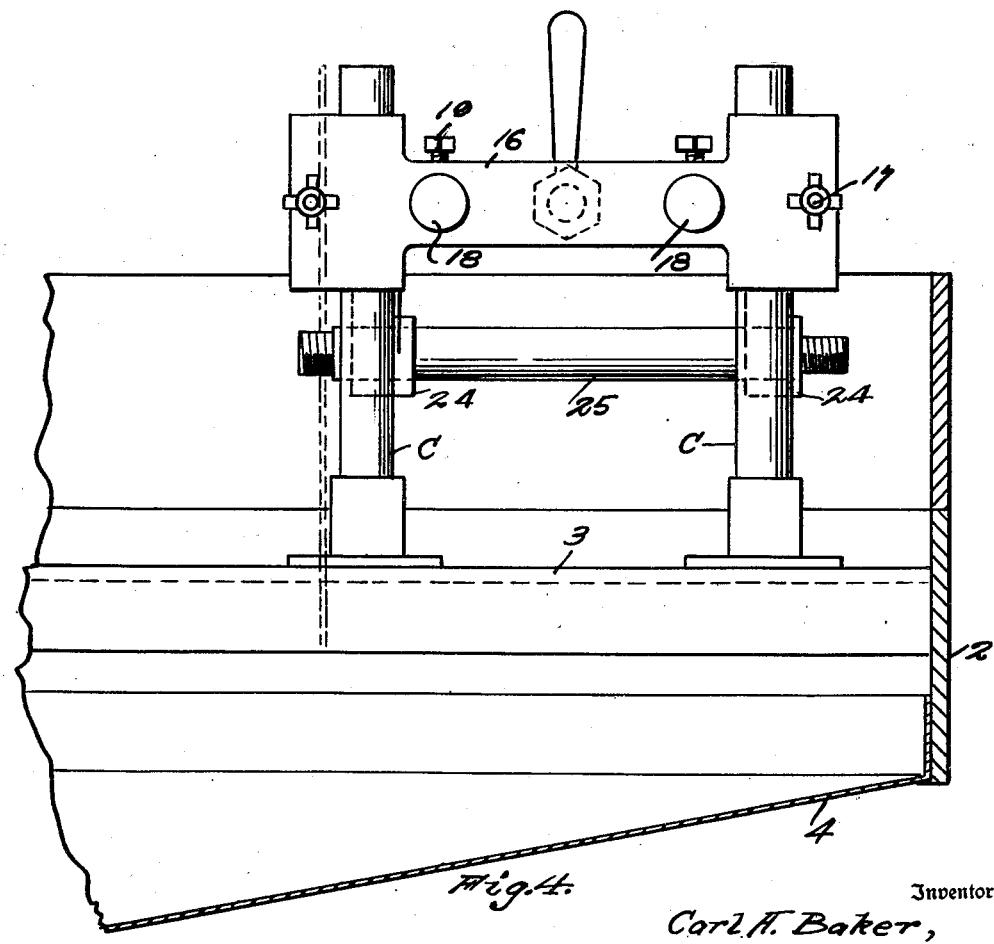

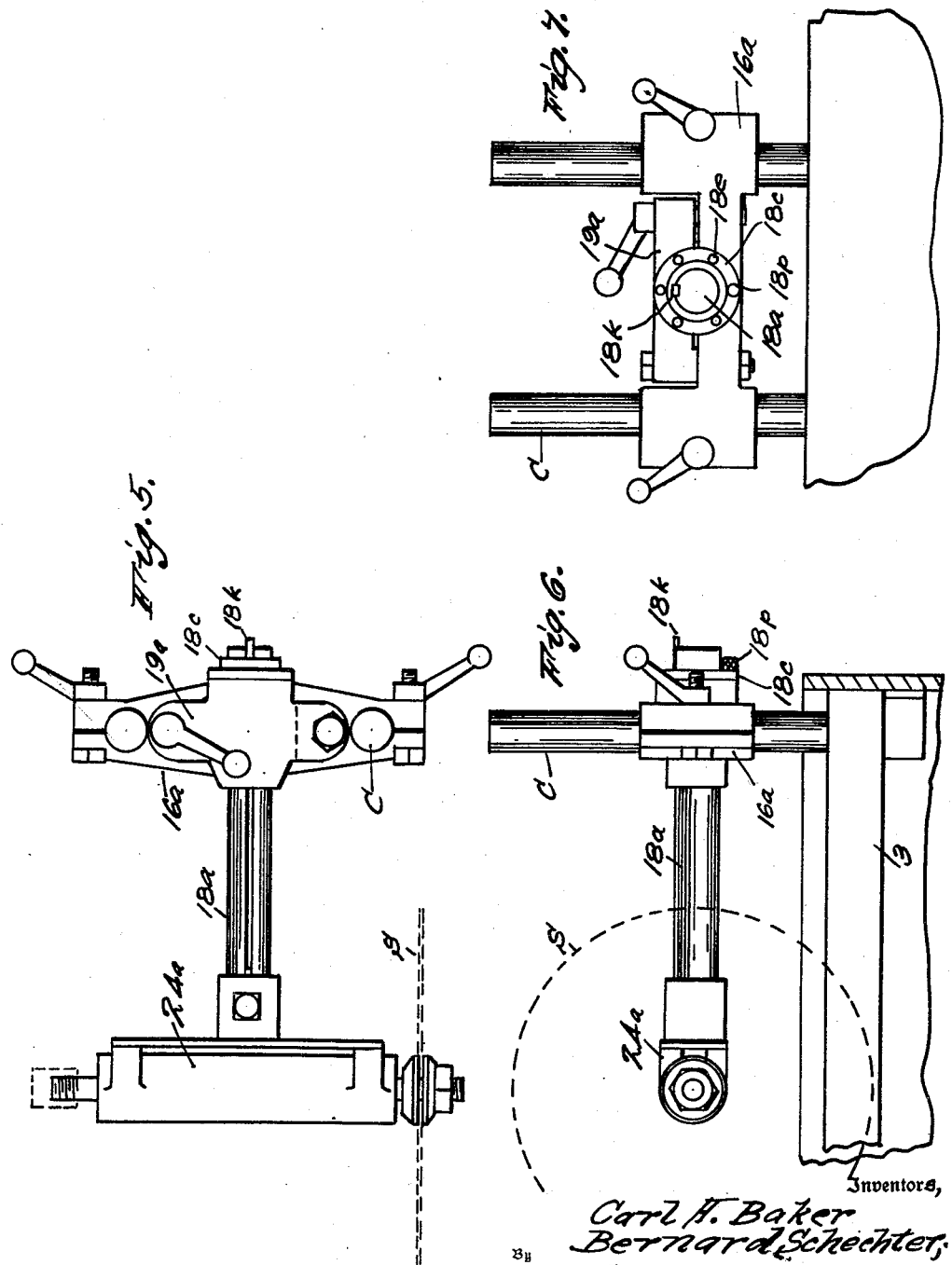

Inventors,
Carl A. Baker
Bernard Schechter;
By Frederick E. Maynard,
Attorney.

Patented June 19, 1951

2,557,251

UNITED STATES PATENT OFFICE 2,557,251

STONE SAWING MACHINE

Carl A. Baker, Van Nuys, and Bernard Schechter, Montebello, Calif., assignors of one-third to Leo A. Adler, Van Nuys, Calif.

Application February 2, 1949, Serial No. 74,104

4 Claims. (Cl. 125—13)

This invention is a multi-utility machine for the effective slabbing of stone and other hard bodies.

It is a noticeable purpose of the invention that the cutting saw blade used in the machine may be so adjusted, in its capacity range, that it will be possible for a saw of say 22-inch diameter to be adjusted to cut through, in one plane, a rock of 18-inch thickness.

A further purpose of the invention is to provide a stone sawing machine wherein the saw can be tilted for a considerable variation of angle of plane-cut through a stone fixed rigidly on a carrying bed which is adjustable, as desired, to obtain stone slabs of desired thickness from the rough or other block.

A further aim of the invention is to provide a simple, substantial, compact and low cost machine of this class.

An additional intent of the invention is to provide a quickly set hold down clamp means having a great shape gripping capacity to solidly fasten a rock or other object which is to be cut on the work bed; particularly for the holding of geodes and nodules, and fragments of gem rocks.

Also a purpose of the invention is to provide a machine in which is provided a saw reach support adapted to be moved vertically from an above-bed cutting position to a lowered position for over pass of the stone as to the saw, driving shaft. This provides for a first deep cut down into the applied stone, on the bed, and then an up cut on the same plane when the saw and its crane are adjusted to a lower position as to the bed.

The invention consists in certain advancements in this art as set forth in the ensuing disclosure and has, with the above, additional objects and advantages as hereinafter developed, and whose constructions, combinations and details of means and manner of operation will be made manifest in the following description of the herewith illustrative embodiments; it being understood that modifications, variations, adaptations and equivalents may be resorted to within the scope, spirit and principles of the invention as it is claimed in conclusion hereof.

Figure 1 is a plan of the machine; the stone bed being retracted from the saw. Figure 2 is a transverse section; showing the bed and the carriage in edge view, and the saw reach support being in elevation. Figure 3 is a detail section across the carriage rails; showing the carriage and its sliding bed in side elevation, with an applied rock (overhanging for slabbing). Figure 4 shows in rear end elevation the crane and its mounting.

Figure 5 is a plan, Figure 6 a side elevation and Figure 7 an end view of a reach support device having a central, rotative arm.

Figure 1:
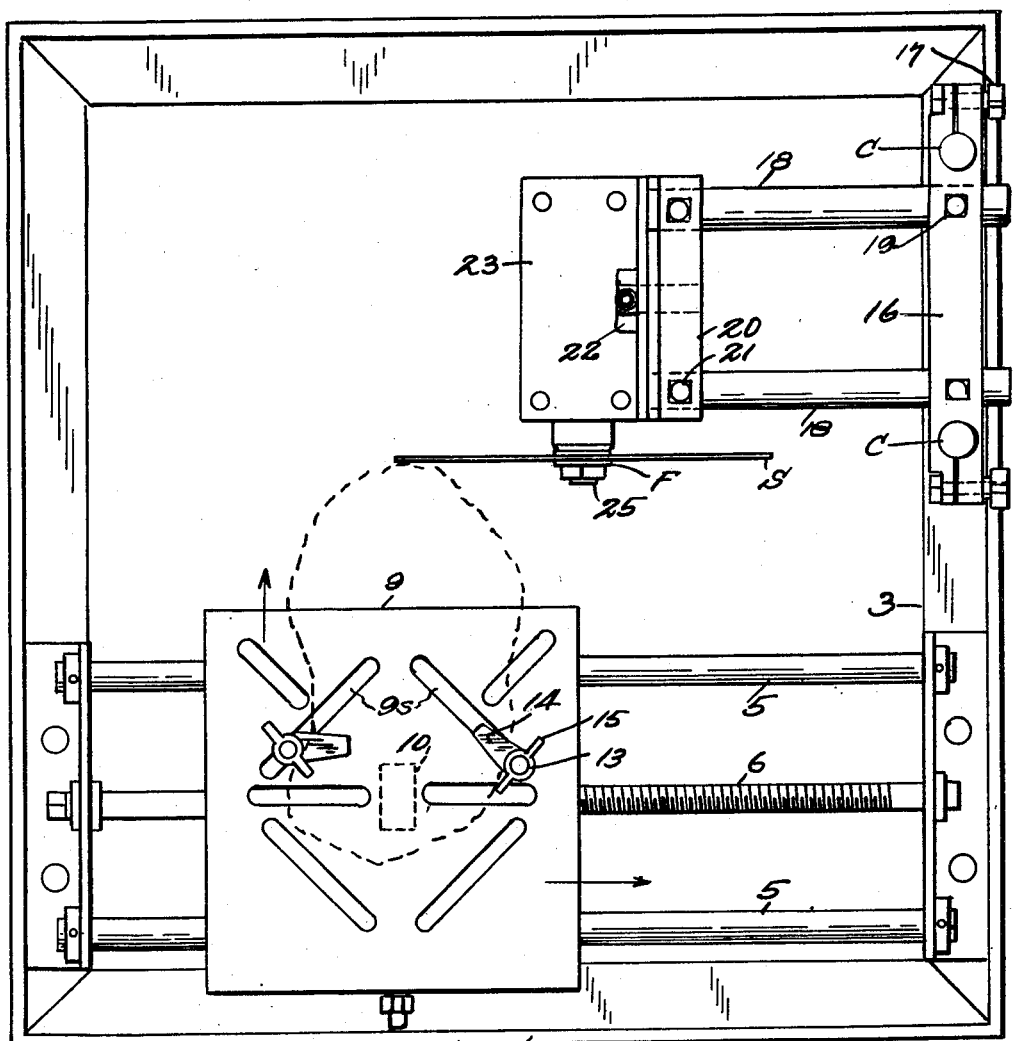

Within a suitable box 2 there is a rigidly fixed, horizontal frame 3 below which is a drain sump 4. Any suitable cover (not shown) may be employed.

Rigidly fixed along and inwardly from one side of the box is a pair of substantial, parallel rails 5, and between them is a suitably driven feed screw 6 suitably mounted in bearings on the frame 3. There is slidably mounted on the rails a carriage 7, driven by the screw 6, or in any other manner as the fancy of the operator may dictate: springs or weights are a common form of drive means to advance the carriage along the rails to press the stone or other object to a disc saw S.

On the carriage 7 is fixed a pair of substantial guide rods 8 and slidably mounted on these rods is a top plate or bed 9 having centrally fixed on its bottom face a nut-boss 10, Fig. 2, in which is an actuating screw 11 whereby to cross-feed the bed on the travelling carriage 7, on which the screw 11 is journalled at its ends against end shift.

A feature of the invention resides in providing the bed with a number of variously directed slots 9s in which are adapted to be solidly affixed, as by foot nuts 12, one or more screw posts 13 standing vertically and each having an adjustable clamp arm 14 on which presser nuts 15, on the screw posts, act to force the arms hard down on best available shoulders as of a rock R, Fig. 3 to hold the rock in such an overhanging position on the bed as will enable successive slabs to be cut off the fixed rock as the rock and its bed 9 are cross-fed to a saw blade S, shown dotted in Fig. 2.

A further feature of the invention resides in a novel means for mounting the saw blade S. A pair of substantial columns C are fixed one back of the other, as to Fig. 1, on a side member of the frame 3, and slidably mounted on the columns is a substantial cross-head 16, Figs. 1 and 4, and which may be rigidly fixed in a desired elevation as to the frame, and the rock carriage, as by clamp screws 17 acting to clinch split ends of the head 16 on the columns. A pair of horizontal reach support bars 18 are longitudinally slidable in the cross-head 16 and may be securedly fastened by clamp screws 19. On the inner ends of the bars 18 there is a cross-tie 20 fixed thereto by clamp screws 21; this tie and the bars 18 constituting a bar carrying unit which can, at will, be reversed for extension from the opposite side of the cross-head 16, as later mentioned.

The cross-tie 20 has a central, horizontal, substantial screw 22 on which there is pivotally mounted a swivel plate 23 having downwardly extending bearings 24, Fig. 4, journalling a substantial shaft 25 on one end of which the saw S may be securely fastened with its plane transverse to the direction of cross-feed of the stone bed. It will therefore be seen that when the pivot screw 22 of the swivel plate 23 is loosened the saw shaft 25 can be tilted up or down from the horizontal position, Fig. 4 to enable a bevel face to be cut on the rock or other object fixed on the carrying bed 9; the screw 22 being set tight after adjustment to desired position. The saw is in a position outward from the end, thereat, of the swivel supporting tie 20.

The rear end of the saw shaft 25 is adapted for the ready attachment of a flexible or other drive shaft or means; not shown.

In operation, a stone is clamped on the bed 9 and the overhanging end of the stone is advanced by the cross-feed screw 11 to a position across the effective plane of the saw S. A cover is then laid over the machine, to prevent throw of such lubricant as may be used, the saw is started, and the carriage 7 begins its advance to feed the stone to the running saw S to make the first slab cut off. This done, the carriage is pushed back along its rails and the bed 9 is shifted inward on the carriage by its feed screw 11 to project the face of the stone beyond the saw plane, for a fresh slab cut, this operation being repeated as desired.

A feature is the capacity for the up or down adjustment of the bar unit and its mounted saw as to the stone bed 9. If a large stone is to be cut the bar unit is raised on the columns to put the saw in front of the upper part of the stone on the bed, then a first cut is made through the stone by feed of the carriage toward the edge of the saw. Then the carriage is pushed back from the saw, and the saw bar unit is lowered on the columns until the saw shaft clamp flange F is just below the top plane of the stone bed 9, and then the carriage is again run to feed the lower portion of the stone to the upwardly projecting saw edge to cut in the same plane where the first kerf was made and sever the slab.

It will be seen that the entire saw support assembly can be loosed from the cross-head and re-installed with the horizontal bars 18 directed outward from the machine and any of various tools or wheels can be applied to the driven saw shaft.

A preferred form of saw support device is shown in Figs. 5 and 6 wherein an arm 18a is centrally, rotatively mounted in its cross-head 16a to provide for vertical tilt of the shaft bearing 24a fixed thereon. This eliminates the obstruction given by the tie 20 of Fig. 1. The arm 18a is keyed at 18k in an index collar 18c having a pin 18p which is passed into one of a series of index eyes 18e, in the collar, as the selected hole may be turned by rotation of the collar, to register with a master hole located in the head 16a at the position of the pin 18p in Figs. 6 and 7. The rotated arm, with the affixed bearing 24a, is clamped by a clamp lever 19a against axial or angular shift.

Figure 8:
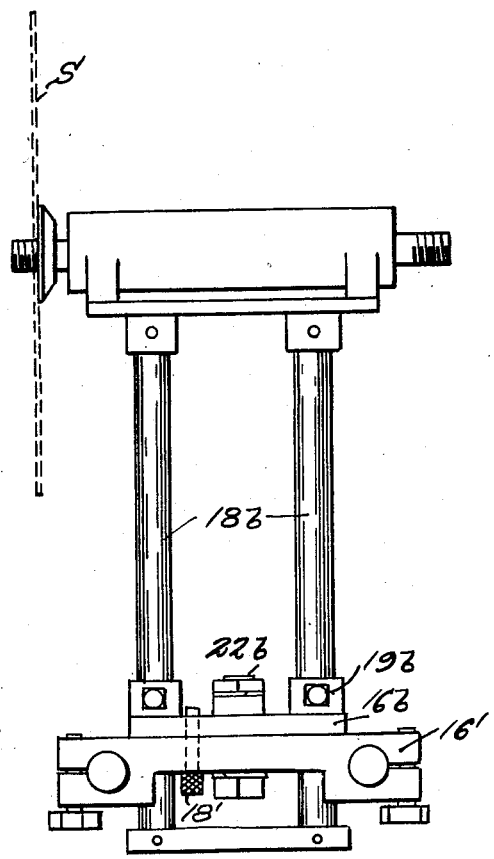
Figure 8 is a plan and Figure 9 an end view of rotative twin-arm reach support arrangement.
Figure 9:
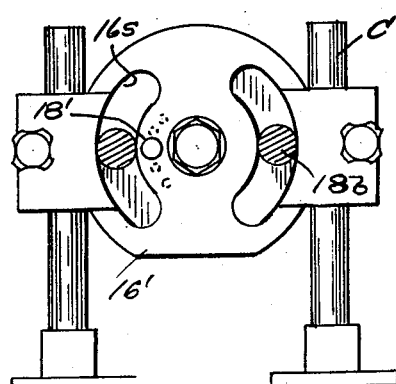

A modification of the rotative crane device is shown in Figs. 8 and 9, as including a pair of parallel arms 18b axially shiftable in a faceplate 16b lapping against one side of a discal cross-head 16' which has opposite, arcuate slots 16s concentric to a central pivot screw 22b on which the plate is mounted and connected to the head 16'. An index pin 18' fixes the plate at selected, rotative position on the head 16', and the arms 18b are fixed longitudinally by suitable means; set screws 19b for example.

What is claimed is:

1. A stone or like material sawing machine comprising a pair of vertical fixed posts, a cross-head mounted on said posts for vertical adjustment and means for fixing the adjusted cross-head to the posts, a reach device including a pair of horizontal arms slidably mounted in said head for horizontal adjustment of the arms between the posts and means for fixing the adjusted arms, and a saw-shaft bearing fixed to and transversely connecting distal ends of the arms; said device being mounted for rotation on said cross-head whereby to tilt the axis of the shaft bearing at any position of adjustment of the reach device.

2. The machine of claim 1; the axis of the shaft bearing being on the axial line of rotation of the said device as to the cross-head.

3. The machine of claim 1; said head having a rotary faceplate in which the arms are slidable and means for fixing the faceplate in adjustable, bearing orienting position.

4. The machine of claim 3; the faceplate having index apertures for change of position and an index pin in the cross-head to engage in any one of the said apertures when registered with the pin.

CARL A. BAKER.
BERNARD SCHECHTER.

REFERENCES CITED

The following references are of record in the file of this patent:

UNITED STATES PATENTS

| Number | Name | Date |
| --- | --- | --- |
| 99,513 | Young et al. | Feb. 1, 1870 |
| 155,734 | Klober | Oct. 6, 1874 |
| 793,391 | Olsson | June 27, 1905 |
| 1,201,134 | Bardeen | Oct. 10, 1916 |
| 1,382,400 | Ross | June 21, 1921 |
| 1,607,641 | Pitkin | Nov. 23, 1926 |
| 1,683,298 | Pitkin | Sept. 4, 1928 |
| 1,909,001 | Nelson | May 16, 1933 |
| 2,382,257 | Ramsay | Aug. 14, 1945 |